No. 826,454. PATENTED JULY 17, 1906.
J. G. TIMMER.
ROTARY STEAM CONNECTION.
APPLICATION FILED DEC. 5, 1905.

Witnesses
Frank Hough
F. S. Elmore

Inventor
John G. Timmer
By Victor J. Evans
Attorney

UNITED STATES PATENT OFFICE.

JOHN G. TIMMER, OF HAMILTON, OHIO.

ROTARY STEAM CONNECTION.

No. 826,454.

Specification of Letters Patent.

Patented July 17, 1906.

Application filed December 5, 1905. Serial No. 290,458.

*To all whom it may concern:*

Be it known that I, JOHN G. TIMMER, a citizen of the United States, residing at Hamilton, in the county of Butler and State of Ohio, have invented new and useful Improvements in Rotary Steam Connections, of which the following is a specification.

This invention relates to pipe-couplings designed especially for connecting the sections of steam-pipes, and has for its object to produce a simple device of this character wherein one of the pipe-sections may rotate freely relative to the other and one wherein expansion and contraction of the pipe-joint may occur, and this without affecting the integrity of the joint.

With these and other objects in view the invention comprises the novel features of construction and combination of parts more fully hereinafter described.

Figure 1:
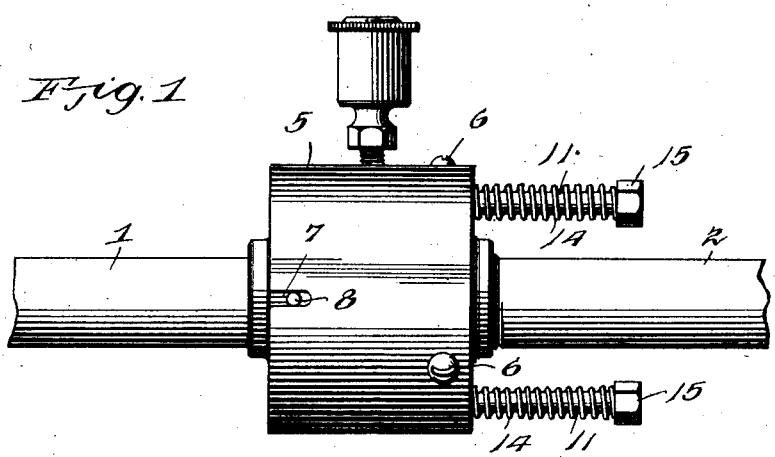
Figure 2:
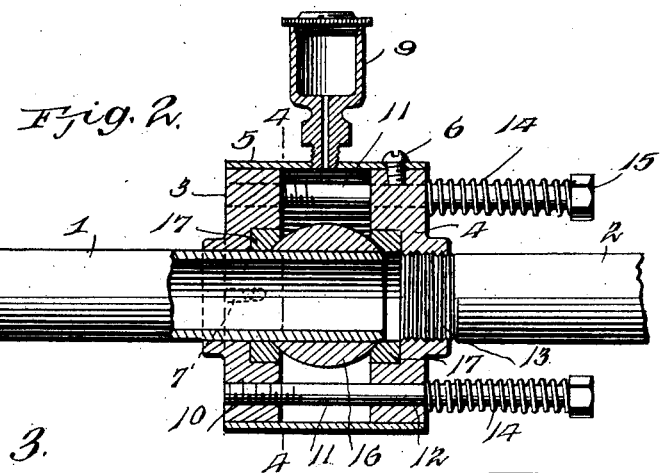
Figure 3:
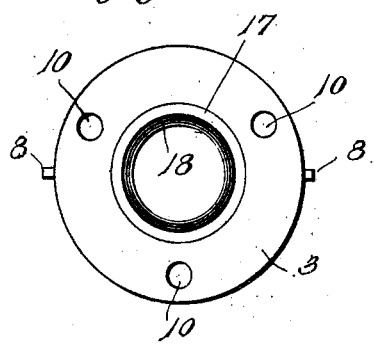
Figure 4:
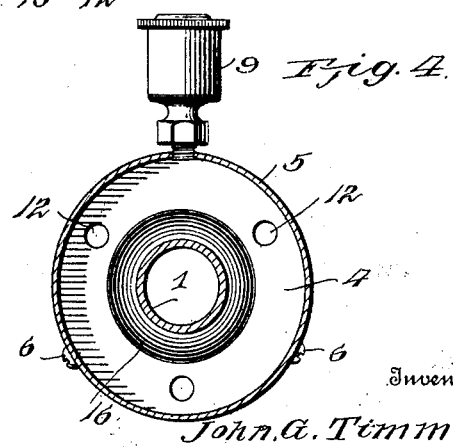

In the accompanying drawings, Figure 1 is a side elevation of a joint embodying the invention. Fig. 2 is a vertical longitudinal section through the joint. Fig. 3 is an inner face view of one of the coupling-heads. Fig. 4 is a section taken on the line 4 4 of Fig. 2.

Referring to the drawings, 1 and 2 designate the pipe-sections assembled in endwise relation and connected by a coupling comprising coupling members or heads 3 and 4 and an outer shell or casing 5, attached at one end to the head 4 by fastening members or screws 6 and provided at its other end with outwardly-opening longitudinal slots 7, formed to receive studs or pins 8 on the head 3 for slidable engagement with the latter, there being tapped into the casing 5 between the heads a lubricator-cup 9 for a purpose which will hereinafter appear.

The head 3, which is slidably disposed upon the pipe-section 1, is provided with a plurality of internally-threaded openings 10 to receive, respectively, the threaded ends of connecting elements or bolts 11, slidably fitted in openings 12, provided in the head 4, with which the pipe-section 2 is in threaded engagement, as at 13, there being arranged upon the bolts 11, which project outward beyond the head 4, normally expanded pressure-springs 14, having bearing at their inner ends upon the coupling member 4 and at their outer ends against the heads 15 of the bolts, it being apparent that these springs tend to draw the coupling-heads together for a purpose more fully hereinafter described.

Applied to the inner end of pipe-section 1 between the coupling-heads 3 and 4 is a substantially spherical bearing 16, while fitted in recesses in the inner faces of the coupling members are packing rings or gaskets 17, provided with suitably-shaped grooves or recesses 18 to receive the adjacent portions of the spherical bearing 16.

In practice the pipe-section 1 may rotate relative to the section 2, owing to the arrangement of the spherical bearing 16 between the inner faces of the coupling-heads 3 and 4, while at the same time relative longitudinal movement of the heads under expansion and contraction of the pipe-sections is permitted by the connecting elements 11 and pressure-springs 14, which latter will, however, act at all times to draw the heads toward each other for maintaining them in proper contact with the ball 16 and insuring a tight joint. It will be observed that lubricant will be fed from the cup 9 to the bearing 16 for obviating friction upon and wearing of the parts.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim is—

In a device of the class described, a pair of pipe-sections assembled in endwise relation, a pair of coupling-heads arranged respectively on the pipe-sections and for relative movement toward and from each other, a tubular shell adapted to receive and in which the coupling-heads are fitted, said shell being slotted for the reception of pins provided on one of the heads, a spherical bearing-head fixed on one of the pipe-sections and disposed between the coupling-heads, connecting-bolts fixed to one of the heads and slidably engaged with the other; said bolts being projected beyond the outer face of the last-named head, pressure-springs coiled upon the bolts and tending to draw the coupling-heads together for maintaining them in snug engagement with the bearing-head, the inner faces of the coupling-heads being recessed, and packing-gaskets fitted in said recesses
5 and adapted to bear on the spherical head for effecting a tight joint between the pipe-sections.

In testimony whereof I affix my signature in presence of two witnesses.

JOHN G. TIMMER.

Witnesses
    SAM D. FITTON, Jr.,
    ANNA STICH.